United States Patent
Cheng et al.

(10) Patent No.: US 7,296,169 B2
(45) Date of Patent: Nov. 13, 2007

(54) METHOD FOR ADJUSTING A FRONT-SIDE BUS FREQUENCY BASED ON A PROCESSOR USAGE RATE STORED IN A TRANSLATION TABLE AND GENERATING THE TRANSLATION TABLE IF IT DOES NOT EXIST

(75) Inventors: Chih-Chuan Cheng, Taipei (TW); Ching-Bin Huang, Taipei (TW); Ming-Chieh Chien, Taipei (TW)

(73) Assignee: Compal Electronics, Inc., Taipei (TW)

( * ) Notice: Subject to any disclaimer, the term of this patent is extended or adjusted under 35 U.S.C. 154(b) by 352 days.

(21) Appl. No.: 10/709,508

(22) Filed: May 11, 2004

(65) Prior Publication Data

US 2005/0125705 A1   Jun. 9, 2005

(30) Foreign Application Priority Data

Dec. 4, 2003   (TW) ............................... 92134149 A

(51) Int. Cl.
*G06F 1/00*   (2006.01)
*G06F 1/32*   (2006.01)

(52) U.S. Cl. .................. 713/322; 713/300; 713/500
(58) Field of Classification Search ............... 713/300, 713/320, 500, 501, 600, 100, 502; 702/117
See application file for complete search history.

(56) References Cited

U.S. PATENT DOCUMENTS

| | | | |
|---|---|---|---|
| 6,907,535 B2 * | 6/2005 | Fang ........................... | 713/322 |
| 7,000,138 B1 * | 2/2006 | Pillay et al. ................. | 713/600 |
| 7,069,463 B2 * | 6/2006 | Oh .............................. | 713/503 |

* cited by examiner

*Primary Examiner*—Mark Connolly
(74) *Attorney, Agent, or Firm*—Jianq Chyun IP Office

(57) ABSTRACT

A method for dynamically adjusting central processing unit (CPU) frequency. Firstly, a translation table is provided between multi-layer of CPU usage percentage and front-side bus operation frequency. Secondly, a current usage percentage of the CPU is obtained. Lastly, the operation frequency of the front-side bus is adjusted to a corresponding layer according to the current usage rage, so that the current usage rage is located within the range of CPU usage percentage that is defined by corresponding layer.

7 Claims, 4 Drawing Sheets

| CPU usage rate | | 4 Layers |
|---|---|---|
| Layer | High Low | Front-end bus Layer(frequency) |
| 1 | 100 ~ 70 | 0 (133MHz) |
| 2 | 80 ~ 50 | 2 (120MHz) |
| 3 | 60 ~ 30 | 4 (110MHz) |
| 4 | 40 ~ 0 | 6 (90MHz) |

FIG. 1B

| Translation Table for CPU front-end bus operation frequency |
|---|
| SMBW,0 ⇒ 133MHz |
| SMBW,1 ⇒ 125MHz |
| SMBW,2 ⇒ 120MHz |
| SMBW,3 ⇒ 115MHz |
| SMBW,4 ⇒ 110MHz |
| SMBW,5 ⇒ 100MHz |
| SMBW,6 ⇒ 90MHz |

FIG. 1C

METHOD FOR ADJUSTING A FRONT-SIDE BUS FREQUENCY BASED ON A PROCESSOR USAGE RATE STORED IN A TRANSLATION TABLE AND GENERATING THE TRANSLATION TABLE IF IT DOES NOT EXIST

CROSS-REFERENCE TO RELATED APPLICATION

This application claims the priority benefit of Taiwan application Ser. No. 92134149, filed Dec. 4, 2003.

BACKGROUND OF THE INVENTION

1. Field of the Invention

This invention generally relates to a method for dynamically adjusting central processing unit (CPU) frequency, and more particularly to a power saving technology to dynamically adjusting CPU frequency.

2. Description of Related Art

As portable computer products prosper, including Personal Digital Assistant (PDA), notebook computer, etc., in addition to functionality of a computer its own, battery endurance is another significant consideration for users. Longer battery endurance brings longer travelling time for users when equipped equally.

Generally speaking, a CPU manufacturer assigns power supply category. Supposing ac power is supplied, CPU usage rate is adjusted to maximum upon efficiency. Yet if a battery is supplied, clocking and operating voltage are both properly reduced accordingly so as to prolong battery endurance. Therefore, in conventional art merely two modes are provided, that is ac power supply mode and battery power supply mode, which do not serve to adjust CPU clock according to CPU usage rate. Besides, the foregoing skill is merely for adjusting internal frequency of the CPU.

Among current Microsoft® operating system or other notebook computer manufacturers, power management is varied with different conditions, for example, power supply categories of desktop computers, notebook computers, etc., which is determined by battery power supply or external ac power supply. However, users need to manually select one of the conditions above under appropriate circumstances in order to comply with current power management mechanism.

MicroStar Technologies Inc. recently publicized a prompt CPU frequency adjustment method under Microsoft operating system, which is posted as patent number No. 511027. This technology provides a frequency selection unit that is displayed via window interface, so as to dynamically adjusting CPU clock and operation voltage. However, the frequencies are limited to what are selectively provided, and an additional core-cell chip has to be supplied, thus relevant routings are altered consequently.

SUMMARY OF THE INVENTION

An object of the present invention is to provide a method for dynamically adjusting CPU frequency, so that the system manages to save power consumption and prolong system operation time by automatically adjusting CPU frequency according to power supply categories.

The present invention provides a method for dynamically adjusting CPU frequency. In this method, a translation table is built firstly, including a plurality of usage rate. Besides, the foregoing skill is merely for adjusting internal frequency of the CPU.

Among current Microsoft® operating system or other notebook computer manufacturers, power management is varied with different conditions, for example, power supply categories of desktop computers, notebook computers, etc., which is determined by battery power supply or external ac power supply. However, users need to manually select one of the conditions above under appropriate circumstances in order to comply with current power management mechanism.

MicroStar Technologies Inc. recently publicized a prompt CPU frequency adjustment method under Microsoft operating system, which is posted as patent number No. 511027. This technology provides a frequency selection unit that is displayed via window interface, so as to dynamically adjusting CPU clock and operation voltage. However, the frequencies are limited to what are selectively provided, and an additional core-cell chip has to be supplied, thus relevant routings are altered consequently.

SUMMARY OF THE INVENTION

An object of the present invention is to provide a method for dynamically adjusting CPU frequency, so that the system manages to save power consumption and prolong system operation time by automatically adjusting CPU frequency according to power supply categories.

The present invention provides a method for dynamically adjusting CPU frequency. In this method, a translation table is built firstly, including a plurality of layers. Each of the layers defines an operation frequency to a front-side bus and corresponding range of CPU usage rate. Secondly, a current CPU usage rate is obtained. Lastly, look up in the translation table upon current usage rate, and adjust front-side bus operation frequency to a corresponding layer, so that the current usage rate locates within the corresponding range of CPU usage rate that is defined by the layer thereof.

In one preferred embodiment of the present invention, a translation table containing various CPU usage rates and front-side bus operation frequencies is provided according to various power supplies. In this case, when the software obtains information about power supply, an entry in the translation table is selected according to the power supply thereof. In each translation table, multiple CPU usage rates correspond to multiple front-side bus operation frequencies. A corresponding front-side bus operation frequency is adjusted thereafter according to the CPU usage rate detected by the duty software, then CPU operation frequency is modified accordingly.

In light of the method provided in this present invention, a system selects various translation tables of CPU usage rate vs. front-side bus operation frequency according to power supply conditions, so as to efficiently reduced unnecessary power consumption since different power is consumed under different processing speed. This present invention saves power most significantly by changing CPU operation frequency especially when battery power is supplied.

The above is a brief description of some deficiencies in the prior art and advantages of the present invention. Other features, advantages and embodiments of the invention will be apparent to those skilled in the art from the following description, accompanying drawings and appended claims.

BRIEF DESCRIPTION OF THE DRAWINGS

FIG. 1B is a translation table depicting CPU usage rate vs. front-side bus operation frequency according to one preferred embodiment of the present invention.

FIG. 1C is a setup table depicting CPU front-side bus according to a preferred embodiment of the present invention.

DESCRIPTION OF THE PREFERRED EMBODIMENTS

Figure 1A:
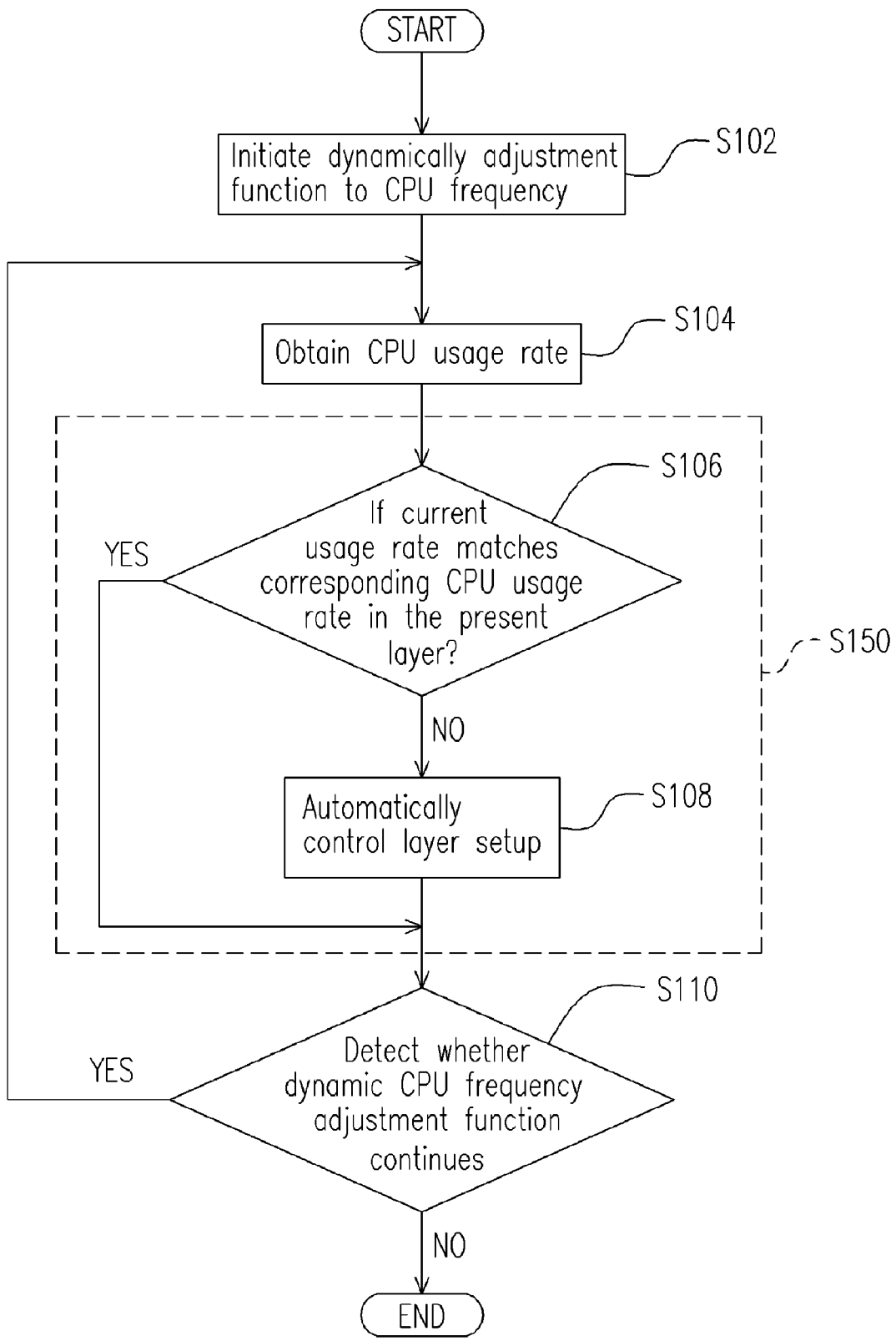
FIG. 1A is a flowchart diagram illustrating a method for dynamically adjusting CPU frequency according to a preferred embodiment of the present invention.

Referring to FIG. 1, it is a diagram illustrating a flowchart according to one preferred embodiment of the present invention. Software provided by this present invention is started firstly as well as the function of dynamically adjusting CPU frequency, and at least one translation table of CPU usage rate vs. front-side bus operation frequency is obtained for the system (as depicted in S102). Thereafter, a current CPU usage rate from CPU or operation system (as depicted in S104) is obtained by the software, and a front-side bus operation frequency is set up according to the CPU usage rate. Lastly, detecting whether the software continues or not, and terminate the software operation when not continuing.

A translation table for CPU usage rate and front-side bus operation frequency is depicted in FIG. 1B, where a plurality of layers (1~4) are included, and each of the layer defines a front-side bus operation frequency and its corresponding range of CPU usage rate. For example, a front-side bus operation frequency is defined as 133 MHz for layer one, and the corresponding CPU usage rate ranges from 100% to 70%. This translation table is either defaulted by software, or being detected, analyzed and determined by hardware detecting system after the machine is started. Moreover, the translation table for CPU usage rate vs. front-side bus operation frequency is not limited to one for one machine; in other words, various translation tables can be provided for various power supplies in order to save power as well as operate efficiently.

Besides, in order to simplify entries in the translation table, simple numbered layers (such as 0, 2, 4, 6) is represented with front-side bus operation frequencies as shown in FIG. 1B, yet practically, real operation frequencies are stored in a setup table as depicted in FIG. 1C. As mentioned above, by altering operation frequency (133 MHz) corresponding to numbered layers in FIG. 1C (such as SMBW, 0), it is easy to change actual correspondence with translation table unchanged.

In one preferred embodiment of the present invention, front-side bus operation frequency can be set up (S150) after CPU usage rate (S104) is obtained according to the steps as follow. Firstly, the CPU usage rate and that in the translation table are compared to ensure if the CPU usage rate corresponds to the layer that contains the current CPU usage rate (S106). If the CPU usage rate matches the layer, proceed to step S110; otherwise proceed to step S108 where the front-side bus operation frequency of CPU is set up according to translation table and the setup table.

Figure 2:
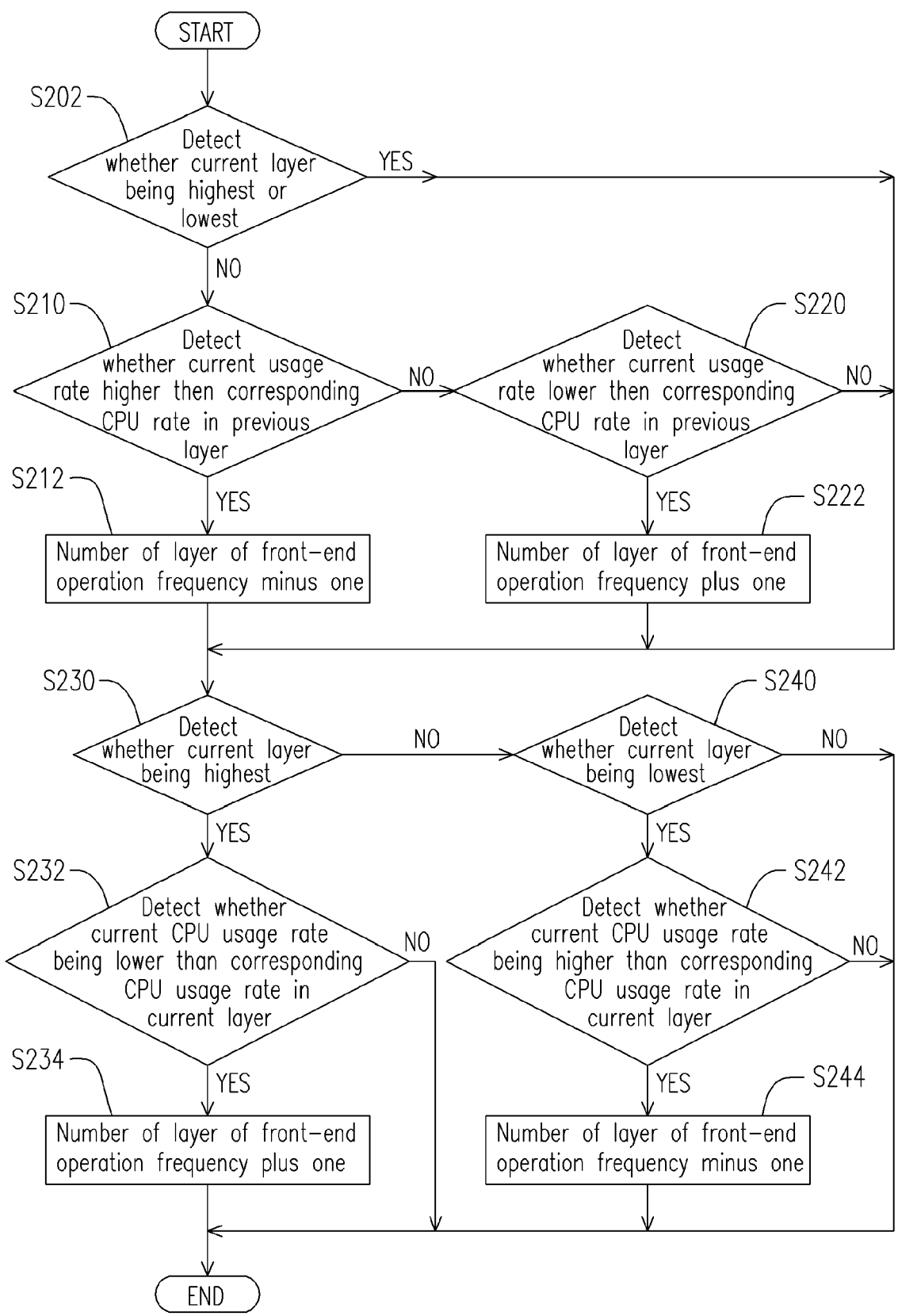
FIG. 2 is a flowchart diagram illustrating a method for dynamically adjusting CPU frequency according to a preferred embodiment of the present invention.

Referring to FIG. 2, it is a diagram illustrating detailed flowchart of step S150 according to one preferred embodiment of the present invention. Firstly, obtaining a current usage rate of CPU, and detecting if the current layer being either highest or lowest layer (as shown in S202). If the current layer being the highest or the lowest, proceed to step S230; otherwise continue detecting whether the current CPU usage rate being higher or not than the upper limit of the CPU usage rate that corresponds to the current layer. Thereafter, if the CPU usage rate is higher than the CPU usage rate that corresponds to the current layer, the front-side bus operation frequency is raised by one layer (or the layer number minus one, as shown in S212). Otherwise detecting if the CPU usage rate is lower than the lower limit of the CPU usage rate corresponding to the current layer (as shown in S220). In step S220, if CPU usage rate detected is lower than the lower limit of the CPU usage rate corresponding to the current layer, the front-side bus operation frequency is lowered by one layer (or the layer number plus one, as shown in S222); otherwise proceed to S230.

After S212, S222 are completed, or the current layer is determined either highest or lowest after detection in step S202, this preferred embodiment proceeds to step S230 for detecting whether the current layer being the highest layer or not. If the current layer is the highest, detect whether the current CPU usage is lower than the lower limit of the CPU usage rate corresponding to the current layer (as shown in S232). Otherwise, detect if the current layer being the lowest layer or not (S240). In step S232, if the pre-detected CPU usage rate is lower that the lower limit of the CPU usage rate corresponding to the current layer, reduce the front-side bus operation frequency by one layer (or the layer level raised by one, as shown S244); otherwise the entire method flow is ended. In step S240, if not being the lowest layer, the entire method flow is ended. If being the lowest layer, detect whether the current CPU usage rate is higher than the upper limit of the CPU usage rate corresponding to the current layer (as shown in S242). In step S242, if the current CPU usage rate being higher than the upper limit of the CPU usage rate corresponding to the current layer, the front-side bus frequency is raised by one layer (or the layer number minus one, as shown in S244); otherwise, the entire method flow is ended.

In addition, if various power supplies are available, each corresponding layer can be modified accordingly. Layer 3 (CPU usage rate between 60% to 30%) corresponds to the front-side bus operation frequency of 110 MHz, as well as layer 4 (CPU usage rate between 40% to 0%) corresponds to the front-side bus operation frequency of 90 MHz) in FIG. 1B, for example. If power being supplied with battery, the correspondence can be mainly modified to frequency down-conversion so that power saving is achieved. For instance, when power is supplied by battery, it is applicable for CPU usage rate between 60% and 0% to correspond to the front-side bus operation frequency of 90 MHz (referring to FIG. 3 herein). On the contrary, when an external power is supplied (e.g. city electricity), power consumption is not considered, which means operation frequency is more significant, thus the operation frequency is kept high for maximum processing efficiency.

According to one preferred embodiment of the present invention, one million hertz is set to be the clocking interval between each layer of the front-side bus operation frequency in the translation table. The clock of the CPU is progressively raised for stability purpose of the system.

Figures 3, 4:
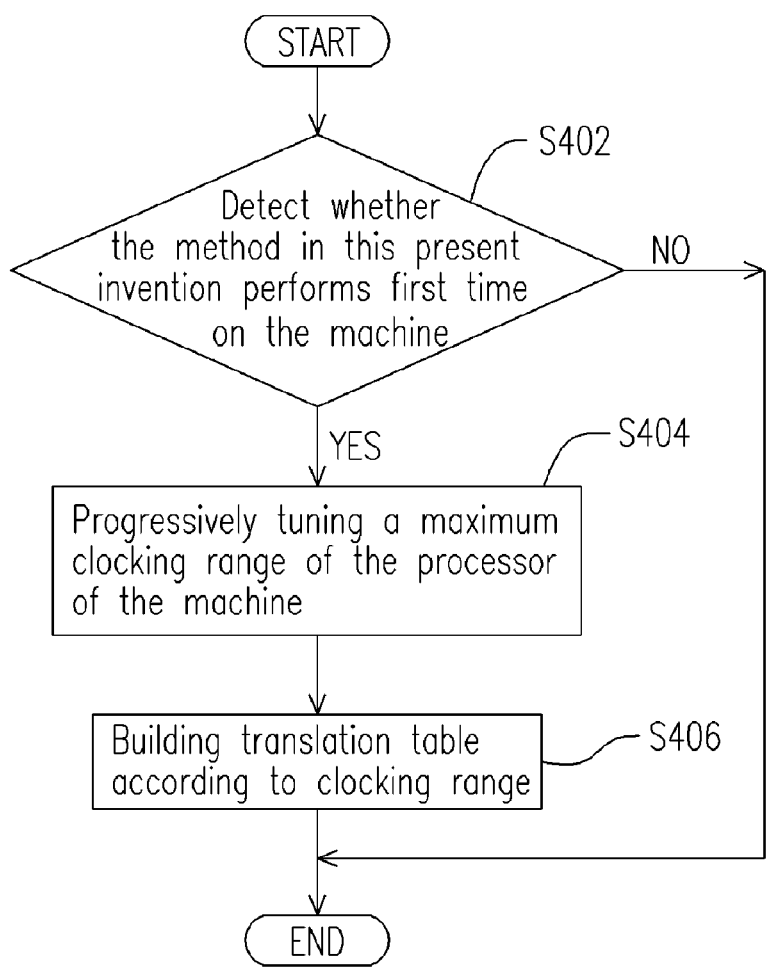
FIG. 3 is a translation table depicting CPU usage rate vs. front-side bus operation frequency that is modified according to FIG. 1B for down-conversion.
FIG. 4 is a flowchart diagram of the translation table for CPU usage rate vs. front-side bus operation frequency.

Referring to FIG. 4, it is a flowchart diagram illustrating correspondence between CPU usage rate and front-side bus operation frequency before translation table is built. In FIG. 4, protection functionality is provided in this present invention, which detects whether the method being first time performed or not on the machine (as shown in S402). If not being the first time, the entire method flow is terminated. If being the first time, a test is exerted in order to determine a maximum clocking range for the CPU (as shown in S404). Consequently, a translation table is established according to the clocking range for the CPU usage rate vs. the front-side bus operation frequency (as shown in S406) so as to ensure the clocking range in this present invention is located in safety range. This protection functionality is designed to comply with different CPU with various frequencies; if being controlled with hardware, not all CPU are possibly complied with.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

The invention claimed is:

1. A method for dynamically adjusting frequency of a central processing unit, comprising:
    detecting whether a translation table exists on a machine having the central processing unit;
    if no:
        progressively tuning maximum of a clocking range for the central processing unit of the machine; and
        establishing a translation table comprising a plurality of layers, according to the clocking range, wherein the translation table is defined for the front-side bus operation frequency of the central processing unit vs. a usage rate;
    if yes:
        obtaining a current usage rate of the central processing unit; and
        comparing the current usage rate with entries in the translation table, adjusting the front-side bus operation frequency to a corresponding layer, so as to locate the current usage rate in the corresponding range of the central processing unit usage rate.

2. The method for dynamically adjusting central processing unit frequency as recited in claim 1, wherein a frequency down-conversion is performed in the translation table when battery power is supplied, and a frequency up-conversions is performed in the translation table when external power is supplied.

3. The method for dynamically adjusting central processing unit frequency as recited in claim 1, wherein an interval between the layers is one million hertz.

4. The method for dynamically adjusting central processing unit frequency as recited in claim 1, wherein the obtaining the current usage rate is performed by measuring with software.

5. The method for dynamically adjusting central processing unit frequency as recited in claim 1, wherein the obtaining the current usage rate is performed by measuring with operation system.

6. The method for dynamically adjusting central processing unit frequency as recited in claim 1, wherein when comparing the current usage rate and the translation table, the layer is raised to an upper layer if the current usage rate is higher than the current layer, so as to up-convert the front-side bus operation frequency.

7. The method for dynamically adjusting central processing unit frequency as recited in claim 1, wherein when comparing the current usage rate and the translation table, the layer is dropped to an lower layer if the current usage rate is lower than the current layer, so as to down-convert the front-side bus operation frequency.

* * * * *